C. A. HARTFIEL.
AUXILIARY TREAD FOR PNEUMATIC TIRES.
APPLICATION FILED AUG. 12, 1918.
1,285,993.
Patented Nov. 26, 1918.
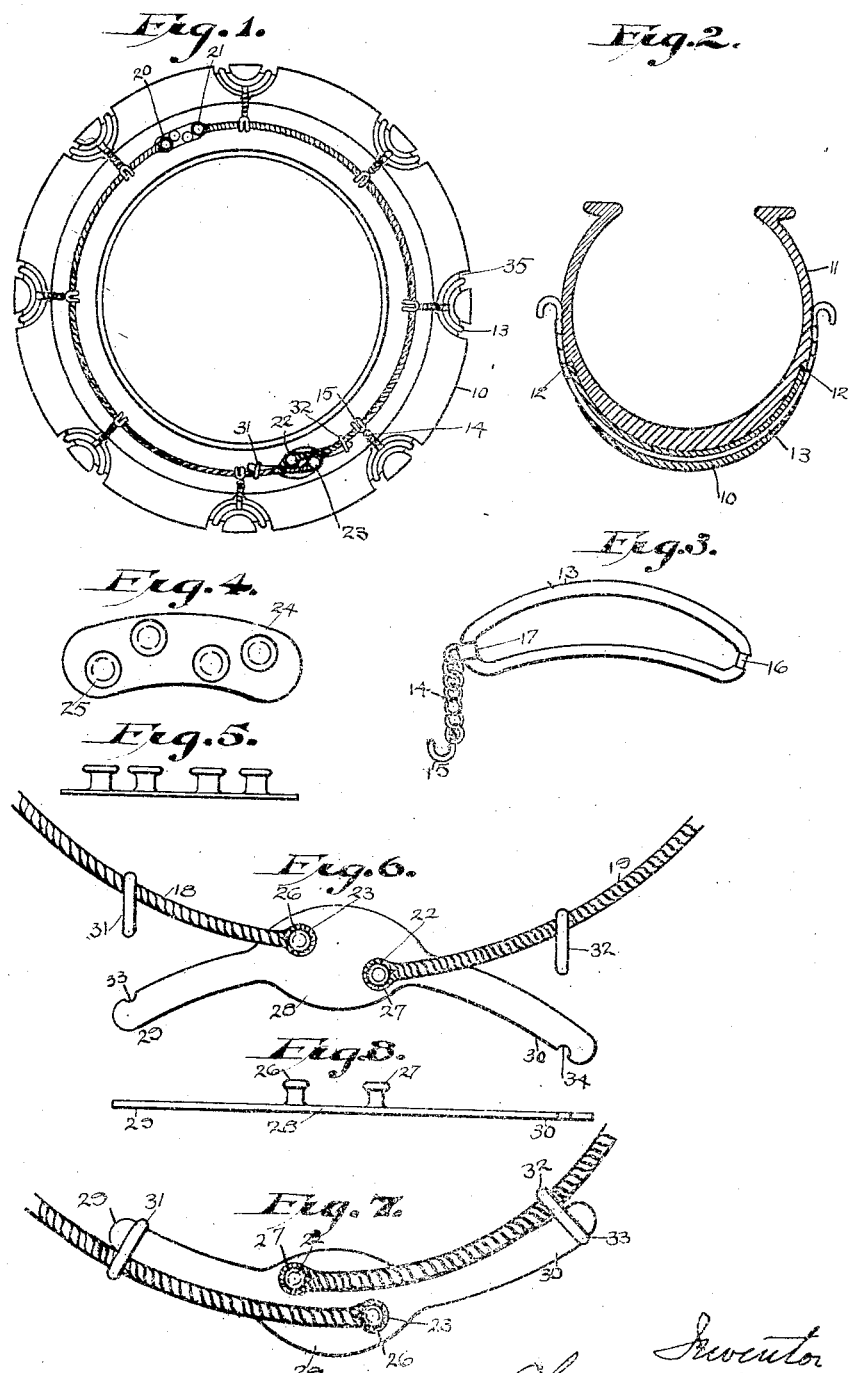

UNITED STATES PATENT OFFICE.

CHARLES A. HARTFIEL, OF NEW HAVEN, CONNECTICUT, ASSIGNOR OF ONE-THIRD TO FRED J. EUERLE, OF HAMDEN, CONNECTICUT, AND ONE-THIRD TO LOUIS ARCTANDER, OF EAST HAVEN, CONNECTICUT.

AUXILIARY TREAD FOR PNEUMATIC TIRES.

1,285,993.  Specification of Letters Patent.  Patented Nov. 26, 1918.

Application filed August 12, 1918. Serial No. 249,546.

*To all whom it may concern:*

Be it known that I, CHARLES A. HARTFIEL, a citizen of the United States, residing at New Haven, in the county of New Haven and State of Connecticut, have invented a new and useful Improvement in Auxiliary Treads for Pneumatic Tires; and I do hereby declare the following, when taken in connection with the accompanying drawings and the characters of reference marked thereon, to be a full, clear, and exact description of the same, and which said drawings constitute part of this application and represent, in—

Figure 1 a side view of my improved tread shown as applied to a pneumatic tire.

Fig. 2 a transverse sectional view of the same.

Fig. 3 a perspective view of one of the tread-retaining loops, detached, and with one of the fastening chains removed.

Fig. 4 a plan view of the cable coupling-piece detached.

Fig. 5 a side elevation of the same.

Fig. 6 a plan view of the tension device shown in the free position.

Fig. 7 a similar view showing the cables under tension.

Fig. 8 a side elevation of the tension device.

This invention relates to an improvement in auxiliary treads for pneumatic tires, the object being to provide an auxiliary or supplemental tread which may be applied to shoes or tires when new, or which are partly worn, so as to protect the wearing surface of new tires or to form a new wearing surface for old tires; and the invention consists in the construction hereinafter described and particularly recited in the claims.

In carrying out my invention, I form an annular tread 10, preferably made from rubber and canvas in the usual way of forming shoes for pneumatic tires. This tread is placed around the shoe 11 which is of any approved construction, but preferably formed on opposite sides with shoulders 12 to receive the edges of the auxiliary tread 10. This auxiliary tread is held in place by means of a series of longitudinally bowed loops 13 to the ends of which chains 14 are attached, the chains terminating in hooks 15. As herein shown, the ends of the loops are reduced to form bars 16 with which eyes 17 on the ends of the chain engage. The several hooks 15 engage on each side with two tension cables 18 and 19, the ends of which are formed with eyes 20, 21, 22 and 23. The ends 20 and 21 are connected by a coupling piece 24 which is formed with a series of posts 25 with either of which the eyes may engage. The eyes of the opposite ends of the cables are set over posts 26 and 27 of a tension clamp 28 which, when the cables are engaged, is turned or reversed in position end for end so as to draw the ends of the cables together, and when so turned, the arms 29 and 30 of the tension clamp 28 are coupled with the cables by links 31 and 32 which are held in place by entering notches 33 and 34 in the ends of the arms.

Preferably and as shown in Fig. 1 of the drawings, the face of the auxiliary tread will be formed with grooves or channels 35 in which the loops 13 will be seated. In applying the auxiliary tread it will first be placed over the shoe and the several loops placed in position and their hooks 15 engaged by the cables 18 and 19. The eyes 20 and 21 of the cables may be set over either of the posts 25 according to the length of cable required, or tension to be applied. The opposite ends of the cable are engaged with the posts 26 and 27 as shown in Fig. 6 of the drawings. When all the loops are in place the tension device is reversed in position as shown in Fig. 7 of the drawings, so that the ends of the cables 18 and 19 are drawn taut and the ends then engaged by the links 31 and 32. Provision is thus made for holding the shoe firmly in place and compensating for variations in sizes. An auxiliary tread as described may be applied to a new shoe so as to prevent the wear upon the surface of the shoe and thus increase the time which the shoe may be used; or my auxiliary tread may be applied to shoes which have become worn and thus increase the length of time which such a worn shoe may be used. While the loops 13 stand below the outer surface of the auxiliary tread when first applied, as the surface wears down these links will serve as anti-skidding devices.

I claim:—

1. The combination with a pneumatic tire, of an auxiliary tread therefor, a series of longitudinally bowed loops extending across said tread, chains connected with opposite ends of said loops, cables with which said loops engage, and means to place the cables under tension.

2. The combination with a pneumatic tire, of an auxiliary tread therefor, said tread formed with grooves in its outer surface, longitudinally bowed loops located in said grooves, chains connected with opposite ends of said loops, said chains terminating in hooks, two cables with which said hooks engage, coupling pieces for connecting the ends of said cable, and a tension device with which the opposite ends of the cables may engage and by which the cables are placed under tension.

3. The combination with a pneumatic tire formed with annular shoulders, of an auxiliary tread therefor the edges of which abut against said shoulders, bowed loops extending across said tread, cables with which said loops are connected, and means for placing the said cables under tension.

In testimony whereof, I have signed this specification in the presence of two subscribing witnesses.

CHARLES A. HARTFIEL.

Witnesses:
ELLEN A. FORD,
HOWARD G. FORD.